United States Patent [19]

Grund

[11] 4,011,691
[45] Mar. 15, 1977

[54] METHOD AND DEVICE FOR REMOVAL OF FINS FROM WORKPIECES

[75] Inventor: Peter Grund, Lutzelsachsen, Germany

[73] Assignee: Messer Griesheim GmbH, Frankfurt am Main, Germany

[22] Filed: July 9, 1975

[21] Appl. No.: 594,299

Related U.S. Application Data

[63] Continuation-in-part of Ser. No. 440,334, Feb. 7, 1974, abandoned.

[30] Foreign Application Priority Data

Mar. 24, 1973 Germany .......................... 2314821

[52] U.S. Cl. .................................... 51/314; 51/164
[51] Int. Cl.² ........................................... B24B 1/00
[58] Field of Search ............. 51/164, 314; 241/184

[56] References Cited

UNITED STATES PATENTS

| 288,919 | 11/1883 | Breer | 259/89 |
|---|---|---|---|
| 1,001,652 | 8/1911 | Kinnell | 51/164 X |
| 2,001,227 | 5/1935 | Jorgensen | 241/184 X |
| 2,066,291 | 12/1936 | Jorgensen | 241/184 X |
| 2,380,653 | 7/1945 | Kopplin | 51/314 |
| 2,682,732 | 7/1954 | Hanrahan | 51/164 |
| 3,145,979 | 8/1964 | Madsen | 241/184 X |
| 3,526,394 | 9/1970 | Howell | 241/184 |

FOREIGN PATENTS OR APPLICATIONS

| 306,016 | 8/1971 | U.S.S.R. | 51/314 |

*Primary Examiner*—Harold D. Whitehead
*Attorney, Agent, or Firm*—Connolly and Hutz

[57] ABSTRACT

Fins or ridges are removed from molded workpieces by insertion into a rotating drum where they are subjected to the action of free hanging chains each mounted at one of its ends to the inner wall of the drum. Each chain has a length no greater than the inside diameter of the drum.

8 Claims, 1 Drawing Figure

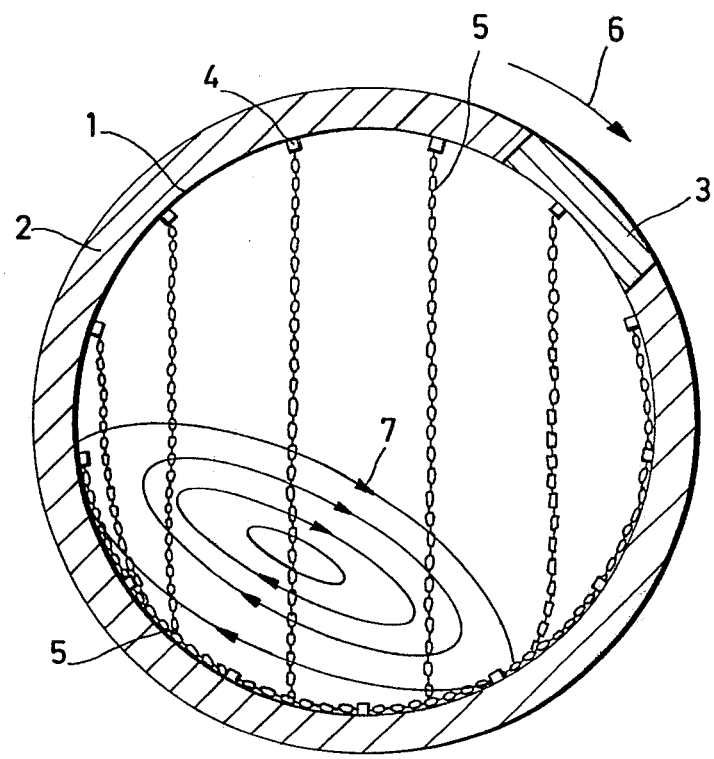

METHOD AND DEVICE FOR REMOVAL OF FINS FROM WORKPIECES

CROSS REFERENCE TO RELATED APPLICATION

This application is a continuation-in-part of application Ser. No. 440,334, filed Feb. 7, 1974, now abandoned.

BACKGROUND OF THE INVENTION

This invention relates to a method and device for the removal of ridges or fins from workpieces of rubber or similar materials, which become brittle by coldness.

A known device of this kind (German Pat. No. 1,207,616), consists of two vertical disks opposing each other, between which, along a part of the circumference of the disk, an endless caterpillar strap is arranged. The workpiece, from which the ridges shall be removed, and which become brittle by a refrigerating agent, are moved upwards by the caterpillar strap, and drop back on the strap by their own weight. By these movements the edges and borders of the workpieces are freed from ridges. For the improvement of the effect of the removal of ridges, in addition, a jet is directed toward the workpiece by a fan blower (centrifugal wheel).

Therefore, in the case of the known device, it is in principle a matter of a horizontally located drum trough, inside of whose interior space there are workpieces, which are freed from the ridges by their proper motion as a consequence of the rotation of the drum.

The invention starts from the above state of the art and has as its object a method and device for removing the fins or ridges from workpieces, considerably simpler in its construction than the known device, which guarantees an optimum removal with respect to quality and amount of workpieces. It is a further object to provide such a method and device which does not contain any expensive parts, which are exposed to wear and tear, such as e.g. the caterpillar belt of the known device.

SUMMARY OF THE INVENTION

The device for freeing workpieces of rubber or the like, from fins or ridges, by the material becoming brittle when cold, consists of a drum rotatable around its horizontally arranged axis, having a fill opening capable of being closed, in which, according to the invention, free hanging chains are fastened at one end to the inside wall of the drum. The length of each chain is the same or shorter than the inside diameter of the drum.

In an advantageous form of this invention the chains are detachably mounted to the drum by being secured to strips which in turn are removably mounted to the drum wall. The strips serve the additional function of agitating or conveying the workpieces during a portion of the drum revolution and additionally permit the ready selection of chains having the proper link dimensions so as to be able to remove flashing from the exposed interior of the workpieces.

THE DRAWINGS

The single FIGURE schematically illustrates in cross-section a device in accordance with this invention.

DETAILED DESCRIPTION

The inventive device includes a rotatable drum having a filling opening and having fastened to its inner surface chains of a length no longer than the inside drum diameter. The drum can have a cylindrical or polygonal column form.

In the device for the removal of ridges according to the invention, molded parts of elastomers can be treated, which are compressed or extruded in multiple tools, are connected with each other by flash and flow channels and form sheets. Also molded parts can be treated, in whose case the flash is relative strong and occurs inside of the molded articles.

The effect of the removal of the ridges originates at relative motional overlappings between the cooled, embrittled molded parts and the enforced direction of motion of the chains. In this manner the mass of the total charge prevents the molded parts from turning aside and pressing away. As another effect, the chains form with their multibranches or links a granulate, which works off the flashes, located at the inside of the parts.

In an advantageous further development of the invention, the chains are fastened in an easily interchangeable way. The interchangeability of the chains has the advantage that an adaptation to the form of the workpieces to be freed from ridges is possible by using chains with differently shaped chain links in each case. As later described the interchangeable or detachable mounting of the chains is accomplished by securing each chain at one end thereof to a strip which in turn is detachably mounted to the inner wall of the drum. As later described the removable strips serve the dual function of not only permitting chains to be easily replaced but also of assisting in the deflashing operation.

In an advantageous further development of the invention, the chains are fastened to strips, which are arranged parallel to the axis on the inside wall of the drum. The device can then be so arranged, that the chains are tightly or permanently fastened to the strips and are exchanged, by exchanging the strips with the chains fastened to them.

The chains are suitably distributed uniformly over the inside wall of the drum; however, this is not a prerequisite for the effectiveness of the device according to the invention.

The drawing illustrates a drum 1 with drum insulation 2. Through a fill opening 3 the drum can be filled with workpieces to be freed from fins or ridges. On the inside wall of the drum strips 4 are arranged parallel to the axis, on which chains 5 are easily detachably fastened. As shown in the drawing, each chain 5 is fastened at only one end to its strip 4. Thus, the chains hang down in part from above, and in part they always lie on the lower part of the inside wall of the drum or between the molded parts. In other words as shown in the drawing when a particular strip 4 is disposed along the top of the drum wall at a particular time during the drum rotation its chain 5 hangs vertically downward from above. When, however, the drum rotates as indicated by arrow 6, that strip will eventually be disposed in the lower portion of the drum whereupon its chain will no longer hang vertically downwardly but will lie along the lower part of the inside wall of the drum or between the molded parts should there be parts in that location. The direction of drum rotation is indicated by arrow 6 and the path of the motions of the workpieces is indicated by arrows 7. The workpieces themselves are not shown for the sake of clarity. The strips 4 have a favorable effect on the motion of the workpieces, since they take along the workpieces in the direction of the motion. In this respect since the strips 4 extend along the inner wall of drum 1 and project inwardly thereof the strips have a tendency to carry the workpieces upwardly during the rotation around the lower portion of the drum until the workpieces are elevated to such an extent that they then fall downwardly. Accordingly, the strips act to further agitate the workpieces and facilitate the removal of the flashing therefrom.

Upon discharging, the fill opening is swung toward its lowest level. The workpieces then drop out, while the chains remain in the drum. Therefore, a separation, e.g. of a jet device or of a granulate, is not required.

The cooling agent is introduced into the drum through a hollow shaft in the form of liquid nitrogen or liquid carbon dioxide its temperature being regulated during the operation via a temperature regulator. However, the workpieces can become brittle also already prior to their introduction into the drum.

In summary the invention is practiced by first subjecting the workpieces to a conventional coolant such as nitrogen which causes the flashing to be embrittled. This embrittling may be accomplished prior to insertion into the drum or may be accomplished after the workpieces are inserted therein by a suitable nozzle. In the meantime detachable mounting strips are selected for securement in any suitable manner to the drum interior. The mounting strips have attached thereto chains with the links being of a sufficiently small size so as to be able to react against the flashing in exposed interior portions of the workpieces. Rotation of the drum is then begun as indicated by the arrow 6. Since the chains have a length no greater than the drum diameter some of the chains would hang freely down from the drum wall while others would have their lower portions disposed against the drum wall. Continued rotation of the drum causes the chains to react against the workpieces including the flashing in the interior thereof to remove the flashing. During rotation this deflashing step is enhanced by strips 4 serving to carry or agitate the workpieces. Rotation is continued until the flashing has been sufficiently removed.

I claim:

1. A method of removing flashing, fins and the like from molded workpieces comprising the steps of detachably mounting chains to the inner wall of a rotatable drum with each chain being mounted at only one end thereof so as to be free hanging and with each chain having a length no greater than the inside diameter of the drum and with the chains being mounted at spaced locations completely around the inner wall of the drum, subjecting the workpieces to a coolant to embrittle the flashing thereon, disposing the embrittled workpieces inside the rotatable drum through an opening in its circumferential wall, closing the drum opening, rotating the drum about its horizontal axis so that the vertical disposition of each chain is changed as each chain moves in a vertical plane around the drum axis, impacting the chains against the flashing for removing the flashing from the workpieces by the action of the chains against the embrittled flashing, and withdrawing the deflashed workpieces from the same drum opening through which they were inserted.

2. In the method of claim 1 wherein the workpieces are embrittled prior to insertion into the drum.

3. In the method of claim 1 wherein the workpieces are embrittled after insertion into the drum.

4. In the method of claim 1 including the step of mounting the chains to the inner wall of the drum by means of detachable strips to which the chains are secured.

5. In the method of claim 4 including utilizing the strips to agitate the workpieces by carrying the workpieces during a portion of the revolution of each respective strip.

6. In the method of claim 5 wherein the workpieces have flashing located in exposed interior portions thereof and including the step of removing the interior flashing by action of the chains with the chains having link dimensions sufficiently small so as to enter the interior portions of the workpieces.

7. In the method of claim 5 wherein the strips are mounted parallel to each other and uniformly spaced from each other about the inner wall of the drum.

8. In the method of claim 1 wherein the workpieces have embrittled flashing located in exposed interior portions thereof and including the steps of selecting chains having link dimensions sufficiently small so as to be able to enter the exposed interior of the workpieces, and utilizing the chains to react against flashing in the exposed interior of the workpieces for removing the flashing therein.

* * * * *